E. ROSS & J. W. McLEOD.
Apparatus for Preparing Cereals for Food.
No. 209,715. Patented Nov. 5, 1878.
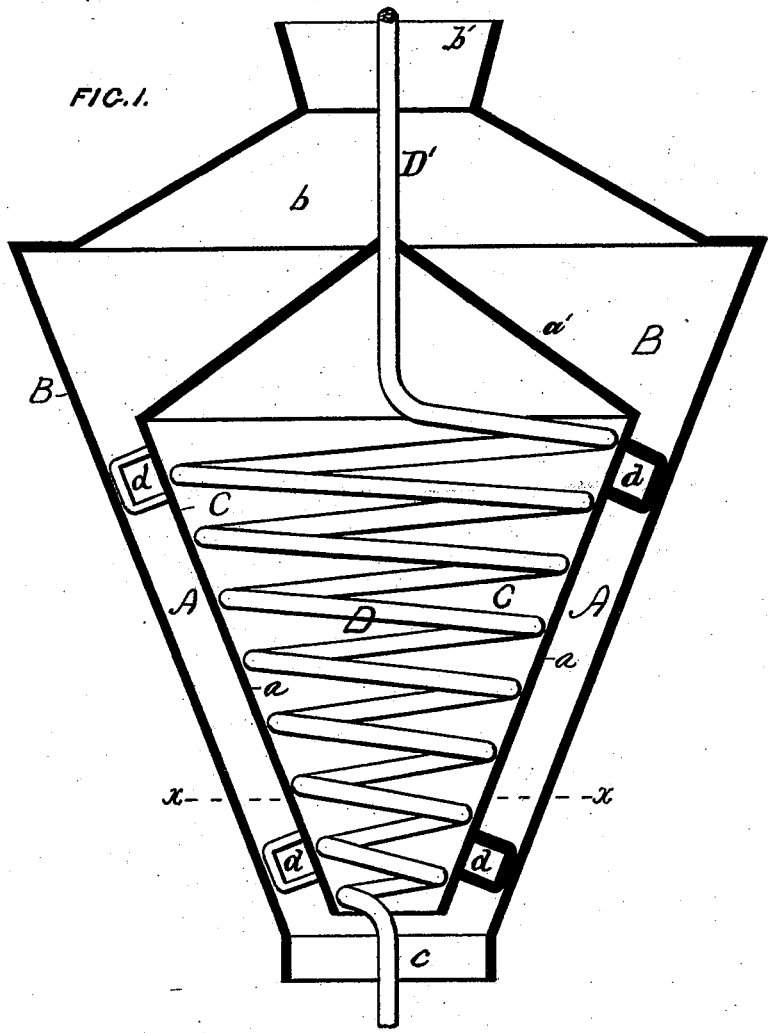
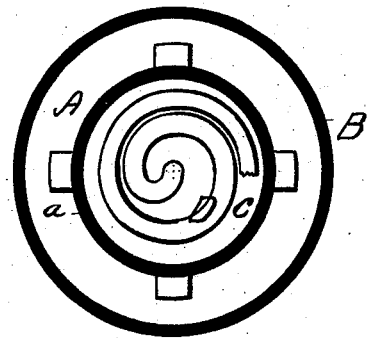
WITNESSES.
Geo. H. Earl
Chas. E. Hibbard
INVENTOR.
Eli Ross.
J. W. McLeod.
Per Brown Bros
Attorneys.

UNITED STATES PATENT OFFICE.

ELI ROSS AND JOHN W. McLEOD, OF BOSTON, MASSACHUSETTS, ASSIGNORS TO UNITED STATES STEAM FEED COMPANY, OF SAME PLACE.

IMPROVEMENT IN APPARATUS FOR PREPARING CEREALS FOR FOOD.

Specification forming part of Letters Patent No. 209,715, dated November 5, 1878; application filed February 4, 1878.

*To all whom it may concern:*

Be it known that we, ELI ROSS and JOHN W. McLEOD, both of Boston, county of Suffolk, and State of Massachusetts, have invented a certain new and useful Apparatus for the Preparation of Cereals as a Feed for Horses, &c., of which the following is a full, clear, and exact description.

This invention relates to an improved apparatus for the preparation of cereals as a feed for horses, &c., by subjecting cereals which have been first softened by steaming the same in a steam-chest, or otherwise, to a heat of such a degree and in such a manner as will quickly dry their shells or exteriors, and thus secure the confinement of the vaporized moisture or steam which permeates their kernels within their so-dried shells or exteriors, whereby, if the shells be then broken or ruptured by passing them through a suitable grinding-mill, or otherwise, which frees the previously-inclosed vapors or steam, as aforesaid, the removal of all those well-known properties of cereals which are injurious in their use as a food for horses, &c., (and which tend to retard their digestion and to produce colic or cramps, and other troublesome and often fatal diseases in horses, &c., when eaten by them,) is practically secured, as will hereinafter more fully appear.

In carrying out this invention, we first take the grains which are to be prepared as a feed, and subject them directly to free steam until they are thoroughly permeated therewith and their kernels softened. We then subject them to heat of a degree which is sufficient to quickly dry their shells or exteriors, and thereby secure the confinement of the steam or other vapor which is permeating their kernels within their shells; and for this purpose we find that a degree of heat of 140° Fahrenheit, or thereabout, is sufficient, and the best effects thereof are obtained by passing the cereals over and in direct contact with plates heated by steam, or otherwise—steam being preferable—to such a degree.

In the accompanying plate of drawings, Figure 1 is a central vertical section, and Fig. 2 a longitudinal section on line $x\ x$, Fig. 1, of the apparatus adapted for such an operation, which apparatus will be hereinafter particularly described.

The cereals, dried as aforesaid, are then broken or ruptured, so as to free the confined steam or vapor, and this is accomplished, preferably, by passing them through a grinding-mill of ordinary construction and adjustment.

The steaming of the cereals, as described, in addition to softening the kernels, more or less, by vaporization, deprives them of those properties which tend to retard digestion. The quickly drying after the steaming tends still further to vaporize these objectionable elements, which, in such state, escape with the steam, when the kernels are subsequently and in proper time broken or ruptured.

In the drawings, A represents an annular conical passage between two cones, B and C, within the inner one of which is arranged a conical coil of steam-pipes, D, for heating the plate $a$, which forms the inner cone, C. From the outer surface of the wall of the inner cone project loops $d$, which support said cone at a proper distance from the outer cone. This inner cone is closely covered by an inverted conical top, $a'$, through the apex of which is an aperture for the passage of the steam-pipe D'. The outer cone has an annular conical top, with a central opening, and surmounted by a hopper, $b'$. The loops $d\ d$ of the inner cone simply rest upon the inner surface of the outer cone, and are not attached thereto, so that any extra or unusual expansion of the grain passing through the conical chamber will not deflect the walls of either cone, both of which we prefer to make of sheet metal, but will simply raise the inner cone, so as to increase the capacity of the annular chamber; and the coil D should be slightly smaller than the inner cone, to permit such raising, or it may be permitted by the elasticity of the connection of the steam-pipe.

The conical form of the shells B C has a very great advantage over a drying-chamber with vertical walls, as the inclined wall of the said cones insures contact of the passing grain and prevents a too rapid passage thereof; and, furthermore, the mass is concentrated after its drying, so as to be delivered from the drier in convenient form. These cones are vertically arranged, as aforesaid, and the grains to be dried enter the passage A at the base $b$, and in passing through it come in contact with the heated plate $a$ and escape at the apex $c$, whence they are taken to or enter the grinding-mill, to be ground, as aforesaid.

Drying and otherwise preparing grain, as aforesaid, in addition to securing the results above described, removes all danger of its fermentation; and, again, the steaming of the grain obviously cleanses the exterior of all dust, &c.

Having thus described our invention, what we claim, and desire to secure by Letters Patent, is—

1. In a grain-drier, the combination of the outer conical vessel, B, the inner conical vessel, C, having loops or supports $d\ d$, and a heating device operating on the interior of said inner conical vessel, substantially as set forth.

2. The combination of the outer conical vessel, B, having the inverted conical top $b$ and hopper $b'$, the inner conical vessel having the loops or supports $d$ and conical top $a'$, and the conical coil D, arranged within said inner vessel, and having its terminals extending outward at opposite ends thereof, and of the outer vessel, substantially as described.

ELI ROSS.
JOHN W. McLEOD.

Witnesses:
EDWIN W. BROWN,
WM. H. RICHARDS.